(12) United States Patent
Wang et al.

(10) Patent No.: US 12,537,791 B2
(45) Date of Patent: Jan. 27, 2026

(54) DOMAIN NAME RESOLUTION, METHOD, SYSTEM, APPARATUS, DEVICE AND MEDIUM FOR EDGE COMPUTING

(71) Applicant: Beijing Volcano Engine Technology Co., Ltd., Beijing (CN)

(72) Inventors: Qing Wang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 19/085,065

(22) Filed: Mar. 20, 2025

(65) Prior Publication Data

US 2025/0300958 A1 Sep. 25, 2025

(30) Foreign Application Priority Data

Mar. 21, 2024 (CN) .......................... 202410330082.X

(51) Int. Cl.
*H04L 61/4511* (2022.01)
*H04L 12/46* (2006.01)

(52) U.S. Cl.
CPC ...... *H04L 61/4511* (2022.05); *H04L 12/4641* (2013.01)

(58) Field of Classification Search
CPC .......................... H04L 61/4511; H04L 12/4641
See application file for complete search history.

(56) References Cited

U.S. PATENT DOCUMENTS

| | | | |
|---|---|---|---|
| 2016/0112270 A1* | 4/2016 | Danait | H04L 41/0893 |
| | | | 709/220 |
| 2021/0021634 A1* | 1/2021 | Babakian | H04L 61/2567 |
| 2021/0075729 A1 | 3/2021 | Fedorov et al. | |
| 2021/0273977 A1* | 9/2021 | Karasaridis | H04L 63/20 |

(Continued)

FOREIGN PATENT DOCUMENTS

| | | |
|---|---|---|
| CN | 103685583 A | 3/2014 |
| CN | 107317752 A | 11/2017 |

(Continued)

OTHER PUBLICATIONS

China National Intellectual Property Administration, Search Report Issued in Application No. 202410330082.X, Apr. 11, 2024, 2 pages.

(Continued)

*Primary Examiner* — Blake J Rubin
(74) *Attorney, Agent, or Firm* — Alleman Hall & Tuttle LLP

(57) ABSTRACT

The present disclosure relates to the field of edge cloud technology, and discloses a domain name resolution method, a system, an apparatus, a device, and a medium for edge computing. The domain name resolution method includes: acquiring a first domain name resolution request forwarded by a virtual device through a network module; converting the first domain name resolution request into a second domain name resolution request, and sending the second domain name resolution request to an authoritative domain name system; and receiving a resolution result of the second domain name resolution request by the authoritative domain name system, and forwarding the resolution result to the virtual device through the network module.

19 Claims, 8 Drawing Sheets

(56) References Cited

U.S. PATENT DOCUMENTS

| | | | |
|---|---|---|---|
| 2022/0029913 A1* | 1/2022 | Lin | H04L 12/4633 |
| 2023/0420147 A1* | 12/2023 | Baker | H04L 61/4511 |
| 2024/0171484 A1* | 5/2024 | Muñoz De La Torre Alonso | |
| | | | H04L 43/062 |
| 2024/0223454 A1* | 7/2024 | Miriyala | H04L 63/20 |
| 2025/0117265 A1* | 4/2025 | Kottapalli | H04L 67/1008 |

FOREIGN PATENT DOCUMENTS

| | | | |
|---|---|---|---|
| CN | 112738296 A | | 4/2021 |
| CN | 112910919 A | | 6/2021 |
| CN | 113726918 A | | 11/2021 |
| CN | 115037720 A | | 9/2022 |
| CN | 115604223 A | | 1/2023 |
| CN | 116112466 A | | 5/2023 |
| CN | 116545982 A | | 8/2023 |
| CN | 117938808 A | | 4/2024 |
| WO | 2021014204 A1 | | 1/2021 |

OTHER PUBLICATIONS

China National Intellectual Property Administration, Search Report Issued in Application No. 202410330082.X, May 23, 2024, 1 page.

Guo, Z. et al., "CDN deployed in edge sites with MEC," China Academic Journal Electronic Publishing House, No. Z2, 2019, 5 of pages. (Submitted with English abstract).

Jinxia, H., "A Brief Analysis of EDNS Capability Exposure Solution," China Academic Journal Electronic Publishing House, Oct. 31, 2020, 6 pages.

Suo, F. et al., "Discussion and analysis of great network technology on the second floor across the data center," China Internet, No. 11, Nov. 30, 2016, 6 pages. (Submitted with English abstract).

Li, H., "Research on Multi-Backhaul Satellite-Terrestrial Fusion Network Resource Management Based on Edge Computing," Thesis for Master Degree, Beijing University of Posts and Telecommunications, May 28, 2020, 78 pages. (Submitted with English abstract).

ISA European Patent Office, International Search Report and Written Opinion for International Application No. PCT/CN2025/080399, mailed Apr. 19, 2025, WIPO, 16 pages.

European Patent Office, Extended European Search Report Issued in Application No. 25165444.8, Jul. 10, 2025, Germany, 20 pages.

Contavalli, C. et al., "Client Subnet in DNS Queries," Internet Engineering Task Force, RFC 7871, May 20, 2016, 30 pages.

\* cited by examiner

DOMAIN NAME RESOLUTION, METHOD, SYSTEM, APPARATUS, DEVICE AND MEDIUM FOR EDGE COMPUTING

CROSS-REFERENCE TO RELATED APPLICATION(S)

This application claims priority to Chinese Application No. 202410330082.X filed on Mar. 21, 2024, the disclosures of which are incorporated herein by reference in their entireties.

FIELD

The present disclosure relates to the field of edge cloud technology, and specifically relates to a domain name resolution method, a system, an apparatus, a device, and a medium for edge computing.

BACKGROUND

An edge cloud computing scenario is a new type of cloud computing scenario. A cloud in the edge cloud computing scenario usually sinks to an edge computer room close to a user side, which is greatly different from a central computer room in a traditional central cloud computing scenario. Central computer rooms in the traditional central cloud computing scenario are usually concentrated in several limited large computer rooms, while edge computer rooms in the edge cloud computing scenario are usually very discrete, and specifically include several widely distributed small computer rooms. Communication between the different edge computer rooms can be achieved through an external network, an internal network, a leased line, or a virtual private network (VPN), so as to establish communication connections between the different edge computer rooms.

SUMMARY

In view of this, the present disclosure provides a domain name resolution method, a system, an apparatus, a device, and a medium for edge computing.

In a first aspect, the present disclosure provides a domain name resolution method for edge computing. The method is applied to a resolver. The domain name resolution method for edge computing includes:

acquiring a first domain name resolution request forwarded by a virtual device through a network module, wherein the virtual device, the network module, and the resolver are deployed on a first physical machine, and the first physical machine is disposed in a first edge computer room;

converting the first domain name resolution request into a second domain name resolution request, and sending the second domain name resolution request to an authoritative domain name system, wherein the authoritative domain name system is deployed on a second physical machine, and the second physical machine is disposed in a second edge computer room; and receiving a resolution result of the second domain name resolution request by the authoritative domain name system, and forwarding the resolution result to the virtual device through the network module.

In a second aspect, the present disclosure provides a domain name resolution system for edge computing. The domain name resolution system for edge computing includes:

a virtual device configured to send a private network domain name resolution request to a network module;

the network module configured to convert the private network domain name resolution request into a first domain name resolution request, and send the first domain name resolution request to a resolver;

the resolver configured to convert the first domain name resolution request into a second domain name resolution request, and send the second domain name resolution request to an authoritative domain name system, wherein the virtual device, the network module, and the resolver are deployed on a first physical machine, and the first physical machine is disposed in a first edge computer room;

the authoritative domain name system configured to resolve the second domain name resolution request to obtain a resolution result, and send the resolution result to the resolver, wherein the authoritative domain name system is deployed on a second physical machine, and the second physical machine is disposed in a second edge computer room;

the resolver further configured to forward the resolution result to the network module; and the network module further configured to forward the resolution result to the virtual device.

In a third aspect, the present disclosure provides a domain name resolution apparatus for edge computing. The domain name resolution apparatus for edge computing includes:

an acquiring unit configured to acquire a first domain name resolution request forwarded by a virtual device through a network module, wherein the virtual device, the network module, and a resolver are deployed on a first physical machine, and the first physical machine is disposed in a first edge computer room;

a converting unit configured to convert the first domain name resolution request into a second domain name resolution request, and send the second domain name resolution request to an authoritative domain name system, wherein the authoritative domain name system is deployed on a second physical machine, and the second physical machine is disposed in a second edge computer room; and a responding unit configured to receive a resolution result of the second domain name resolution request by the authoritative domain name system, and forward the resolution result to the virtual device through the network module.

In a fourth aspect, the present disclosure provides a computer device. The computer device includes a memory and a processor. The memory and the processor communicate with each other. The memory stores computer instructions. The processor executes the computer instructions to perform the domain name resolution method for edge computing according to the first aspect or any one of the embodiments corresponding to the first aspect.

In a fifth aspect, the present disclosure provides a computer-readable storage medium. The computer-readable storage medium stores computer instructions. The computer instructions are used for enabling a computer to perform the domain name resolution method for edge computing according to the first aspect or any one of the embodiments corresponding to the first aspect.

BRIEF DESCRIPTION OF THE DRAWINGS

In order to more clearly explain the technical solutions in the specific embodiments of the present disclosure or in the prior art, the following will briefly introduce the drawings that need to be used in the description of the specific embodiments or the prior art. Obviously, the drawings in the following description are some embodiments of the present disclosure, and for those of ordinary skill in the art, other drawings can be obtained according to these drawings without paying creative labor.

DETAILED DESCRIPTION OF EMBODIMENTS

Figure 1:
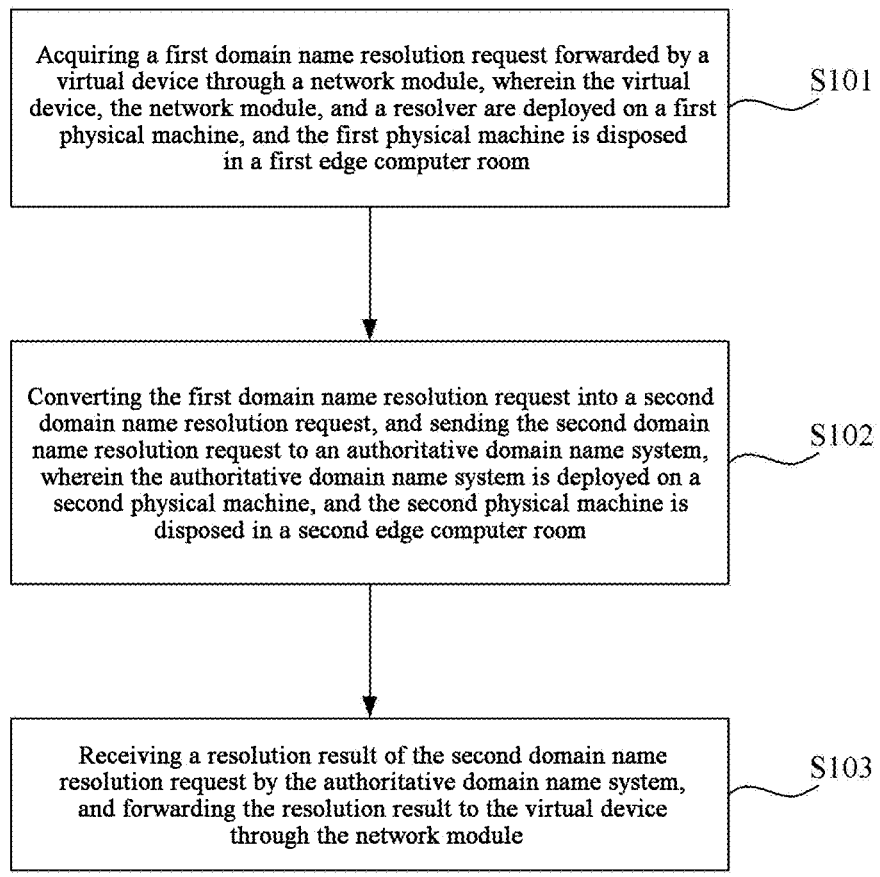
FIG. 1 is a schematic flowchart of a domain name resolution method for edge computing according to an embodiment of the present disclosure.

In order to make the purpose, technical solutions and advantages of the embodiments of the present disclosure clearer, the technical solutions in the embodiments of the present disclosure will be clearly and completely described below with reference to the drawings in the embodiments of the present disclosure. Obviously, the described embodiments are part of the embodiments of the present disclosure, not all of them. Based on the embodiments in the present disclosure, all other embodiments obtained by those skilled in the art without creative labor fall within the protection scope of the present disclosure.

In a cloud computing scenario, a virtual private cloud (VPC) may be used for characterizing a dynamic configuration result of cloud computing resources. The VPC is generally a cloud network, and may be implemented through a virtual extensible local area network (VXLAN), while a network under the cloud generally refers to an underlying physical machine network. Users may create different VPCs to achieve network isolation between different tenants through an internal network, so that resources such as virtual devices of different tenants do not interfere with each other. The virtual devices (such as virtual machines or containers) in the cloud computing scenario are usually the request sources for DNS resolution, and these virtual device resources are usually virtualized and created on physical machines, and virtual devices in different VPCs may be created on a physical machine.

The cloud computing scenario mainly includes a central cloud computing scenario and an edge cloud computing scenario. For the DNS resolution service in a central computer room in the traditional central cloud computing scenario, each tenant may customize the domain name resolution to achieve purposes such as no interference with each other and tenant isolation. For example, a private zone or a private network domain name system (Private DNS) may be used for achieving a tenant isolation service. The tenant isolation services implemented in these two manners are both deployed in a cloud. Each central computer room is configured with a set of DNS cluster, and resolution isolation at the software level is achieved through a combination of physical resources and network virtualization. However, in the case of implementing the above solution in the edge cloud computing scenario, each computer room needs to be deployed with a set of private network DNS, which will result in a very large scale of the DNS and make it very inconvenient to maintain. Moreover, some small computer rooms have very low DNS traffic, and if each computer room is deployed with a DNS cluster independently, the deployment cost will be very high and the cost performance will be relatively low. In addition, some edge computer rooms have a very small scale, and even only a single-digit number of physical machines. In this case, the physical machines in the edge computer rooms may only be used for providing the DNS resolution service, and cannot provide other cloud computing services. Therefore, if the DNS deployment solution of the central computer room is directly applied to the edge computer rooms, a small edge computer room may not have sufficient resources to deploy the DNS, and even if all the edge computer rooms have sufficient resources to deploy the DNS, it will result in problems such as a very large scale of the DNS and a very high deployment cost.

In view of this, the present disclosure provides a domain name resolution method, a system, an apparatus, a device, and a medium for edge computing to solve the problems in the related art that the scale of the DNS is too large, the maintenance is difficult, and the deployment cost is high.

In the present disclosure, the resolver deployed on the first physical machine in the first edge computer room is used for converting the first domain name resolution request forwarded by the virtual device through the network module, send the second domain name resolution request obtained through conversion to the authoritative domain name system deployed on the second physical machine in the second edge computer room for resolution, and send the resolution result fed back by the authoritative domain name system to the virtual device. It can be seen that in the solution for domain name resolution provided in the present disclosure, the authoritative domain name system and the virtual device resource are deployed separately on the basis of implementing the function of domain name resolution, so that the case where a set of domain name system is deployed for each edge computer room is avoided, and the problems in the related art that the scale of the domain name system in the edge cloud computing scenario is large, the maintenance is difficult, and the deployment cost is high are overcome. Compared with the related art, the present disclosure can greatly reduce the scale of the domain name system, reduce the difficulty of maintenance, and reduce the deployment cost in the edge cloud computing scenario.

The present disclosure provides a distributed private network DNS system suitable for an edge computing scenario, which can be deployed in discrete edge computer rooms in a distributed manner, so that the problem of complex DNS deployment in the edge computing scenario is solved. In addition, the architecture of the domain name resolution system provided in the present disclosure does not require a set of DNS system to be deployed in each edge computer room independently. Thus, the authoritative domain name system and the virtual device resource are deployed separately on the basis of implementing the function of domain name resolution, so that the case where a set of domain name system is deployed for each edge computer room is avoided, and the problems in the related art that the scale of the domain name system in the edge cloud computing scenario is large, the maintenance is difficult, and the deployment cost is high are overcome.

According to an embodiment of the present disclosure, an embodiment of a domain name resolution method for edge computing is provided. It should be noted that the steps shown in the flowcharts of the drawings may be executed in a computer system such as a set of computer-executable instructions, and although a logical order is shown in the flowcharts, in some cases, the steps shown or described may be executed in an order different from the order here.

In this embodiment, a domain name resolution method for edge computing is provided, which can be applied to a resolver. FIG. 1 is a flowchart of a domain name resolution method for edge computing according to an embodiment of the present disclosure. As shown in FIG. 1, the process includes the following steps.

Step S101, acquiring a first domain name resolution request forwarded by a virtual device through a network module, wherein the virtual device, the network module, and the resolver are deployed on a first physical machine, and the first physical machine is disposed in a first edge computer room.

The first edge computer room in this embodiment is an edge computer room in an edge computing scenario, and the virtual device includes at least one of a virtual machine or a container. The following implementations will be explained in detail in the case where the virtual device is a virtual machine, and the case where the virtual device is a container is similar to the former.

In some optional implementations, the network module is a network connection component, and the network module may be, for example, a virtual switch (vSwitch). In this embodiment, the cloud network and the network under the cloud may be connected through the vSwitch, and the DNS data package sent from the virtual device may be forwarded to the resolver. The resolver (Resolver) in this embodiment is specifically a resolution node, which generally belongs to a component for DNS recursion and iteration, and can shunt a DNS request, forward an internal network tenant domain name to the authoritative DNS, and forward an external network recursive resolution request to the external network (Internet). Of course, the resolver can also cache the DNS resolution request. The content cached by the resolver (Resolver) may be distinguished by a VNI (VXLAN Network ID).

Figure 4:
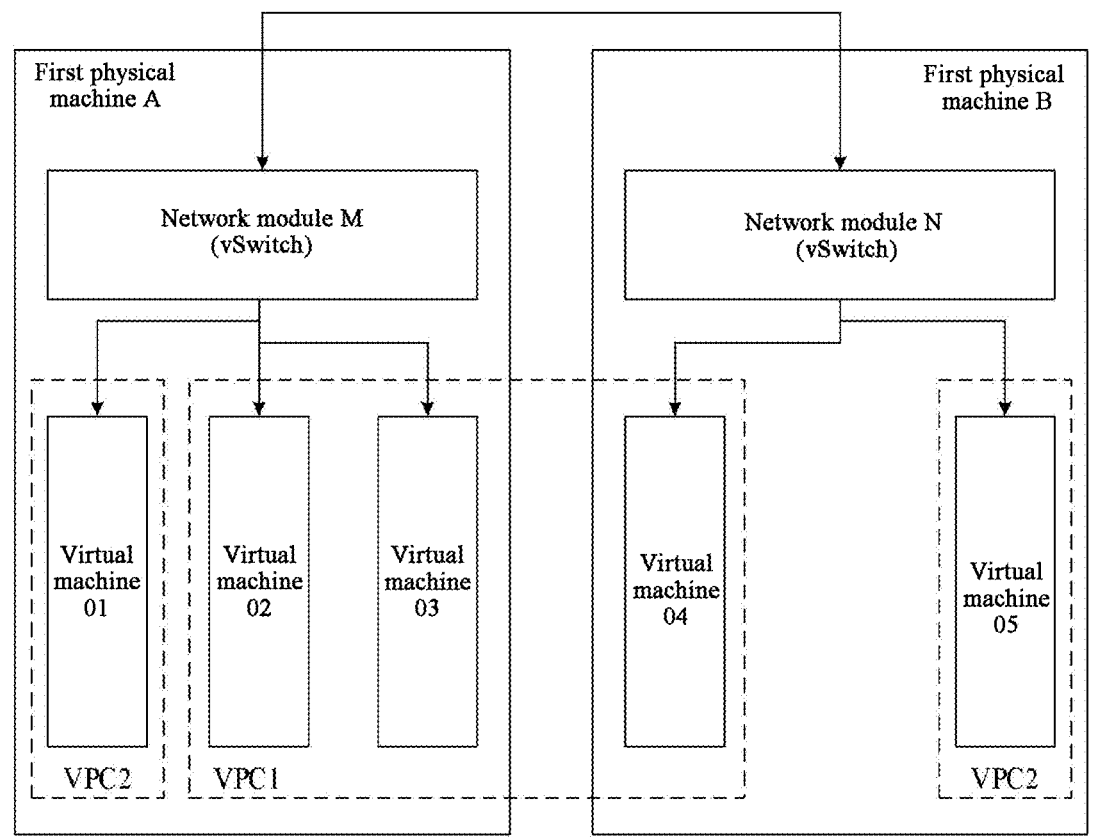
FIG. 4 is a schematic diagram of an arrangement of virtual devices according to an embodiment of the present disclosure.

As shown in FIG. 4, a first physical machine A and a first physical machine B are shown. A virtual machine 01, a virtual machine 02, a virtual machine 03 and a network module M (vSwitch) may be deployed on the first physical machine A, and a virtual machine 04, a virtual machine 05 and a network module N (vSwitch) may be deployed on the first physical machine B.

Exemplarily, a user may create VPC1 and VPC2. VPC1 includes the virtual machine 02, the virtual machine 03 and the virtual machine 04, and VPC2 may include the virtual machine 01 and the virtual machine 05. The virtual machine 01, the virtual machine 02 and the virtual machine 03 communicate with each other or communicate with an external device through the network module M (vSwitch), and the virtual machine 04 and the virtual machine 05 communicate with each other or communicate with an external device through the network module N (vSwitch). The network module M (vSwitch) is communicatively connected to the network module N (vSwitch). The VPC may be provided to the user as an independent sales unit, and different VPCs are isolated from each other and do not interfere with each other.

Figure 5:
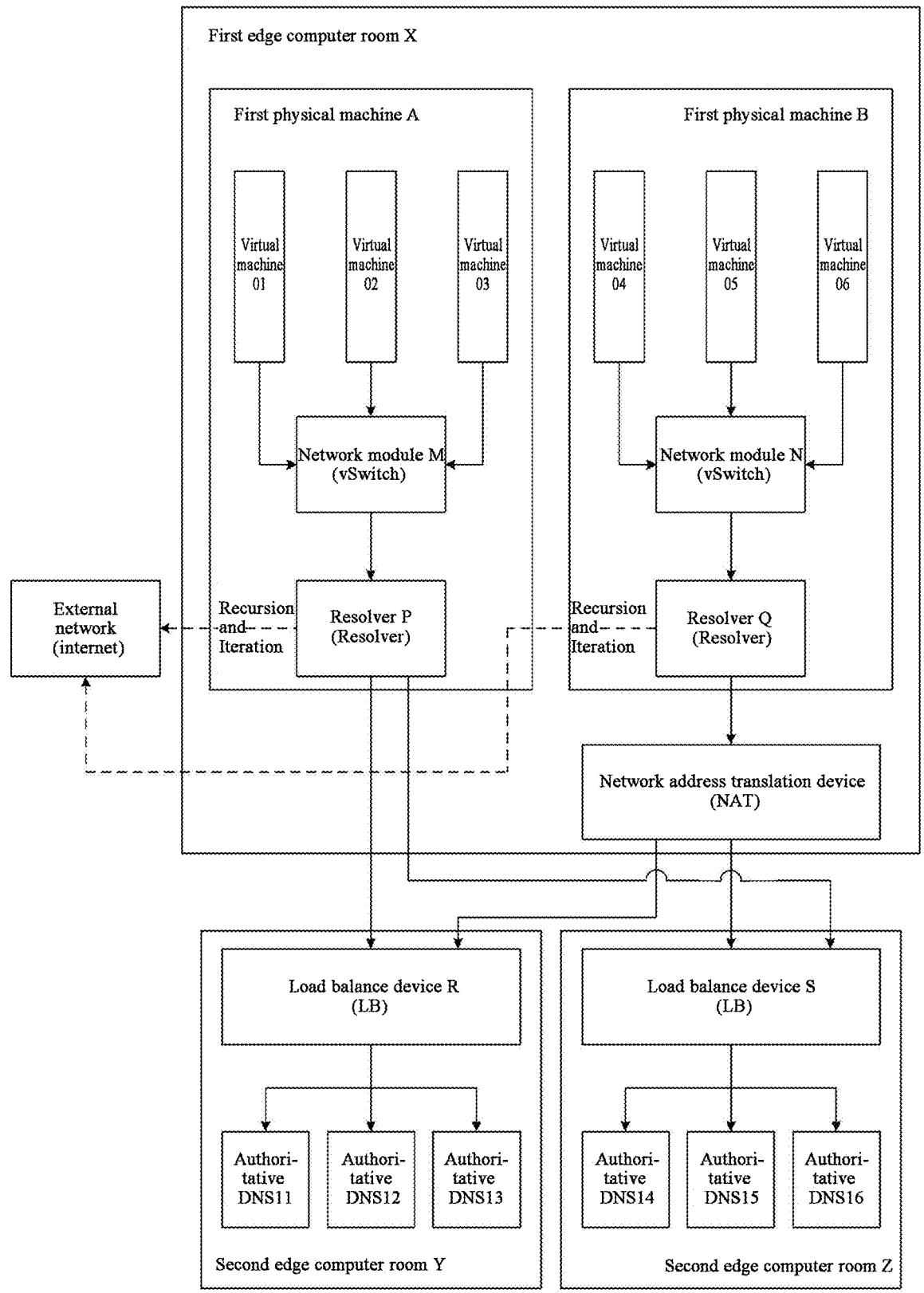
FIG. 5 is a schematic diagram of the implementation principle of a domain name resolution method for edge computing according to an embodiment of the present disclosure.

As shown in FIG. 5, in some embodiments, a first physical machine A and a first physical machine B are deployed in a first edge computer room X. A virtual machine 01, a virtual machine 02, a virtual machine 03, a network module M (vSwitch) and a resolver P (Resolver) may be deployed on the first physical machine A, and a virtual machine 04, a virtual machine 05, a virtual machine 06, a network module N (vSwitch) and a resolver Q (Resolver) may be deployed on the first physical machine B. The virtual machine 01, the virtual machine 02 and the virtual machine 03 are communicatively connected to the network module M (vSwitch), respectively, the network module M (vSwitch) is communicatively connected to the resolver P (Resolver), the virtual machine 04, the virtual machine 05 and the virtual machine 06 are communicatively connected to the network module N (vSwitch), respectively, and the network module N (vSwitch) is communicatively connected to the resolver Q (Resolver). Optionally, each virtual machine may point to a virtual Resolver address, which may be the same globally and essentially represents the Resolver on the physical machine. In this embodiment, the Resolver software may be deployed in each first physical machine in the first edge computer room, and the Resolver software does not need to occupy an independent physical machine/virtual machine, thereby greatly saving the physical cost of the DNS. The deployment cost of the DNS does not increase linearly with the increase of the scale of the edge computer room, and it can be seen that the deployment cost of the DNS is greatly reduced in this embodiment.

In this embodiment, the virtual device sends a private network DNS resolution request (a private network domain name resolution request) to the network module, and the network module converts the private network DNS resolution request into the first domain name resolution request. For example, at least one of the virtual machine 01, the virtual machine 02 and the virtual machine 03 sends a private network DNS resolution request to the network module M (vSwitch), or at least one of the virtual machine 04, the virtual machine 05 and the virtual machine 06 sends a private network DNS resolution request to the network module N (vSwitch). The network module M (vSwitch) or the network module N (vSwitch) may convert the received private network domain name resolution request into the first domain name resolution request, and send the first domain name resolution request to the corresponding resolver.

In some optional implementations, before acquiring the first domain name resolution request forwarded by the virtual device through the network module, the domain name resolution method further includes: acquiring configuration information delivered by an edge private network domain name system console, wherein the configuration information is used for characterizing a resolution rule for a target domain name resolution request, and the target domain name resolution request includes the first domain name resolution request.

The resolution rule for the target domain name resolution request means that some pre-configured target domain names may be resolved through the authoritative DNS, and for a domain name that is not within a scope of the target domain name, the domain name may be forwarded to the external network for recursive iterative resolution.

Figure 9:
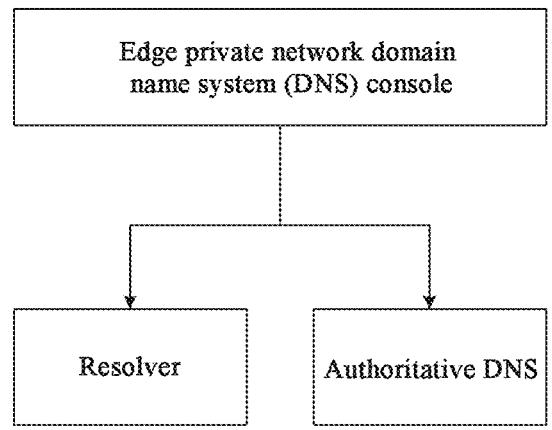
FIG. 9 is a schematic diagram of the implementation principle that configuration information is delivered by an edge private network domain name system console according to an embodiment of the present disclosure.

As shown in FIG. 9, the edge private network domain name system console receives user configuration related information, and the user configuration related information includes configuration information and DNS resolution rule information. The edge private network domain name system console is configured to configure a resolution rule for the target domain name resolution request by the resolver (Resolver) and an authoritative DNS resolution rule. Specifically, the resolver (Resolver) acquires the configuration information of the edge private network domain name system console, and then may perceive which domain names need to be forwarded to the authoritative DNS for resolution. For a domain name that cannot be resolved, the resolver (Resolver) may be forwarded to the external network for recursive iterative resolution. The authoritative DNS resolves the received domain name resolution request according to the DNS resolution rule information delivered by the edge private network domain name system console.

In the embodiment of the present disclosure, the edge private network domain name system console delivers the configuration information to the resolver, so that the resolver can accurately perceive which domain name resolution requests may be sent to the authoritative DNS for resolution, and which domain name resolution requests cannot be resolved through the authoritative DNS but can only be sent to the external network for iterative resolution. Through the process that the edge private network domain name system console receives the configuration information configured by the user, delivers the configuration information and makes the configuration information effective, the reliability and flexibility of the domain name resolution process can be effectively improved.

Step S102, converting the first domain name resolution request into a second domain name resolution request, and sending the second domain name resolution request to an authoritative domain name system, wherein the authoritative domain name system is deployed on a second physical machine, and the second physical machine is disposed in a second edge computer room.

The authoritative domain name system deployed on the second physical machine can provide a domain name resolution resource for the virtual device on the first physical machine, and the domain name resolution resource is specifically provided as a shared resource to the virtual machines deployed in the first edge computer room.

The second edge computer room in this embodiment is an edge computer room in an edge computing scenario, and the second edge computer room and the first edge computer room are two independent computer rooms, and the second physical machine in the second edge computer room is communicatively connected to the first physical machine in the first edge computer room. The communication between the first edge computer room and the second edge computer room may be achieved through a leased line or an external network. For example, in the case of the external network, if there is a VPN, the first edge computer room and the second edge computer room may be connected through the VPN. In addition, in this embodiment, the communication data message may be encrypted, and the encryption method may be selected from the related art. The authoritative domain name system in this embodiment, that is, the authoritative DNS, is a server responsible for private network domain name resolution.

In some optional implementations, the second edge computer room is, for example, a central computer room in a central cloud computing scenario, and the second edge computer room in this embodiment is a computer room with high stability. Optionally, the authoritative domain name system in the second edge computer room may reuse the private network authoritative DNS resource of the central computer room.

In some optional implementations, there are at least two second edge computer rooms, which may include, for example, a second edge computer room Y and a second edge computer room Z shown in FIG. 5.

In the embodiments of the present disclosure, the reliability of the response to the domain name resolution request is improved through at least two second edge computer rooms. Even if one of the second edge computer rooms has an unexpected failure, the authoritative DNS resource may still be provided through the second edge computer room without failure, so that the continuity and reliability of the service are guaranteed.

As shown in FIG. 5, the resolver in this embodiment may be, for example, a resolver P (Resolver) or a resolver Q (Resolver). The resolver P (Resolver) is configured to convert the first domain name resolution request sent by a network module M (vSwitch) into a second domain name resolution request, and the resolver Q (Resolver) is configured to convert the first domain name resolution request sent by a network module N (vSwitch) into a second domain name resolution request. Next, the resolver P (Resolver) or the resolver Q (Resolver) is configured to send the second domain name resolution request to the corresponding authoritative DNS. The authoritative DNS includes, for example, an authoritative DNS 11, an authoritative DNS 12, and an authoritative DNS 13 deployed in the second edge computer room Y, and/or an authoritative DNS 14, an authoritative DNS 15, and an authoritative DNS 16 deployed in the second edge computer room Z. Therefore, the Resolver in this embodiment can connect a virtual network and a physical network, and use the physical network to carry DNS data and interact with the authoritative DNS.

In some optional implementations, the sending the second domain name resolution request to the authoritative domain name system includes: sending the second domain name resolution request to a load balance device, wherein the load balance device is configured to allocate the second domain name resolution request to the authoritative domain name system.

In this embodiment, the access to the authoritative domain name system may be responsible for the load balance device, and the external network IP (Internet Protocol) of the load balance device may publish an anycast address (the same IP), so that disaster recovery and local access can be achieved.

As shown in FIG. 5, for the process that the resolver P (Resolver) or the resolver Q (Resolver) sends the second domain name resolution request to the corresponding authoritative DNS, in this embodiment, multiple second domain name resolution requests may be shunted through the load balance device R (LB, Load Balance) or the load balance device S (LB), so that the second domain name resolution requests are distributed to the corresponding authoritative DNS, such as any one of the DNS 11, the authoritative DNS 12, the authoritative DNS 13, the authoritative DNS 14, the authoritative DNS 15, and the authoritative DNS 16. The load balance device in this embodiment may be deployed on a third physical machine in the second edge computer room, and the third physical machine is the same as or different from the second physical machine. The specific process of distributing the multiple second domain name resolution requests to the authoritative DNS through the load balance method may be selected from related solutions, and will not be repeated.

In the embodiments of the present disclosure, the load balance device is used for distributing the second domain name resolution requests. Even in the case of a large number of second domain name resolution requests and a high concurrency, the load of each authoritative DNS can still be reasonably adjusted, so that the authoritative DNS resources can be fully utilized to ensure the high availability of the authoritative DNS.

In some optional implementations, in the process of sending the second domain name resolution request to the corresponding authoritative DNS, the resolver in this embodiment may forward the second domain name resolution request through the network address translation device (NAT, Network Address Translation) shown in FIG. 5, so that the second domain name resolution request is first sent to the load balance device, and then the load balance device distributes the second domain name resolution request to the corresponding authoritative DNS.

Step S103, receiving a resolution result of the second domain name resolution request by the authoritative domain name system, and forwarding the resolution result to the virtual device through the network module.

In this embodiment, the authoritative domain name system can resolve the received second domain name resolution request to obtain the resolution result. The authoritative domain name system can parse a VNI from the second domain name resolution request, and perform the tenant-isolated domain name resolution according to the VNI. The resolution result may be a DNS data packet.

In some optional implementations, while converting the first domain name resolution request into the second domain name resolution request, the domain name resolution method further includes: maintaining a session connection between the resolver and the network module.

Specifically, in this embodiment, the session connection between the resolver and the network module is maintained by storing quintuple data in the first domain name resolution request, and then the original session connection may be found by receiving the quintuple data of the message when responding to the first domain name resolution request.

In some optional implementations, the forwarding the resolution result to the virtual device through the network module includes: forwarding the resolution result to the virtual device through the network module based on the session connection between the resolver and the network module.

The session connection between the resolver and the network module may be achieved by acquiring the pre-stored quintuple data in the first domain name resolution request.

In this embodiment, the resolution result is fed back by maintaining an existing session connection, so that the communication efficiency is improved, and the response result is guaranteed to be accurately sent to the virtual machine that sends the corresponding private network domain name resolution request.

The domain name resolution method for edge computing provided in this embodiment is specifically a method for implementing a private network DNS applied in an edge computing scenario. In this embodiment, the resolver deployed on the first physical machine in the first edge computer room is used for converting the first domain name resolution request forwarded by the virtual device through the network module, and send the second domain name resolution request obtained through conversion to the authoritative domain name system deployed on the second physical machine in the second edge computer room for resolution, and send the resolution result fed back by the authoritative domain name system to the virtual device. It can be seen that in the solution for domain name resolution provided in this embodiment, the authoritative domain name system and the virtual device resource are deployed separately on the basis of implementing the function of domain name resolution, so that the case where a set of domain name system is deployed for each edge computer room is avoided, and the problems in the related art that the scale of the domain name system in the edge cloud computing scenario is large, the maintenance is difficult, and the deployment cost is high are effectively overcome. Compared with the related art, this embodiment can greatly reduce the scale of the domain name system, reduce the difficulty of maintenance, and reduce the deployment cost in the edge cloud computing scenario.

Figure 2:
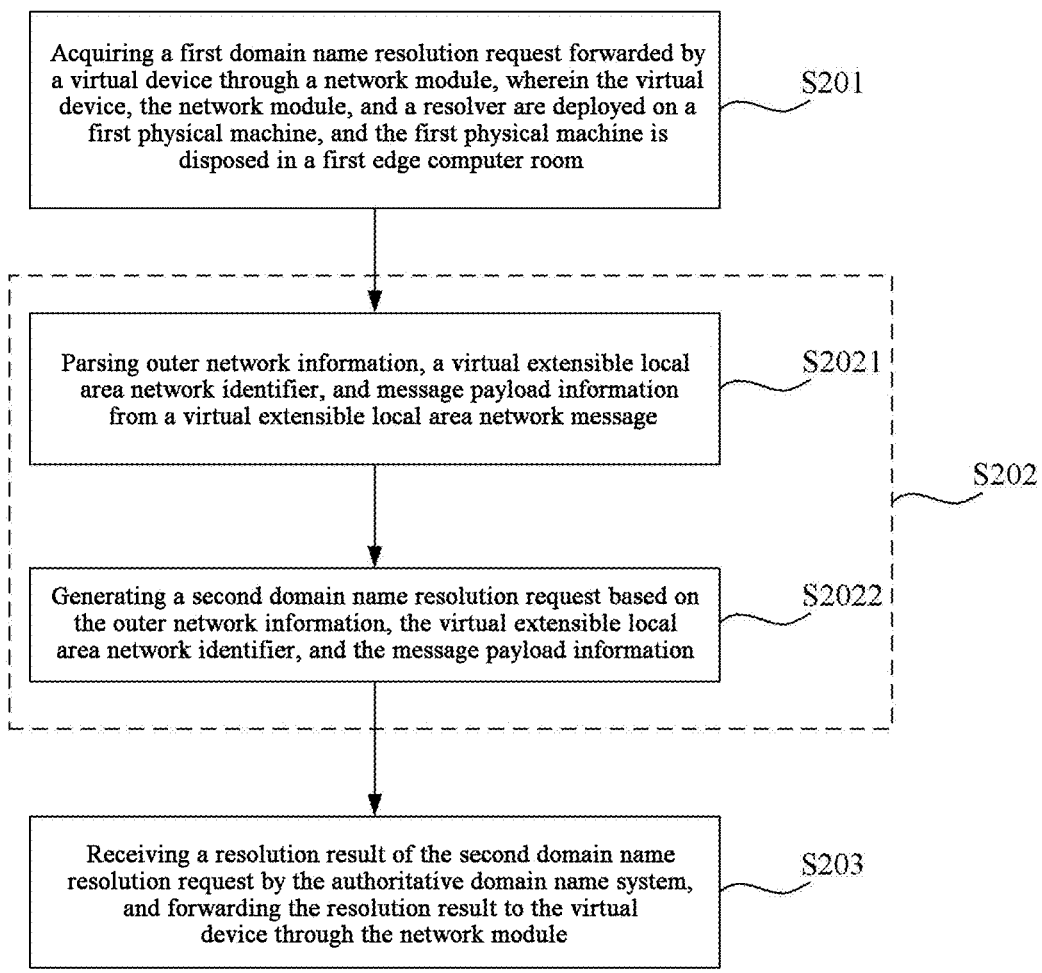
FIG. 2 is a schematic flowchart of another domain name resolution method for edge computing according to an embodiment of the present disclosure.

In this embodiment, a domain name resolution method for edge computing is provided, which can be applied to a resolver. FIG. 2 is a flowchart of a domain name resolution method for edge computing according to an embodiment of the present disclosure. As shown in FIG. 2, the process includes the following steps.

Step S201, acquiring a first domain name resolution request forwarded by a virtual device through a network module, wherein the virtual device, the network module, and the resolver are deployed on a first physical machine, and the first physical machine is disposed in a first edge computer room. The first domain name resolution request is a virtual extensible local area network (VXLAN) message.

In some optional implementations, the network module is a virtual switch (vSwitch), and the virtual switch is configured to encapsulate a domain name resolution message sent by the virtual device into a virtual extensible local area network (VXLAN) message. The domain name resolution message is the private network domain name resolution request.

The virtual machine in this embodiment may encapsulate the domain name resolution message through a customized protocol or an extended domain name resolution protocol to obtain the virtual extensible local area network message, and the virtual extensible local area network message is the first domain name resolution request.

Figure 6:
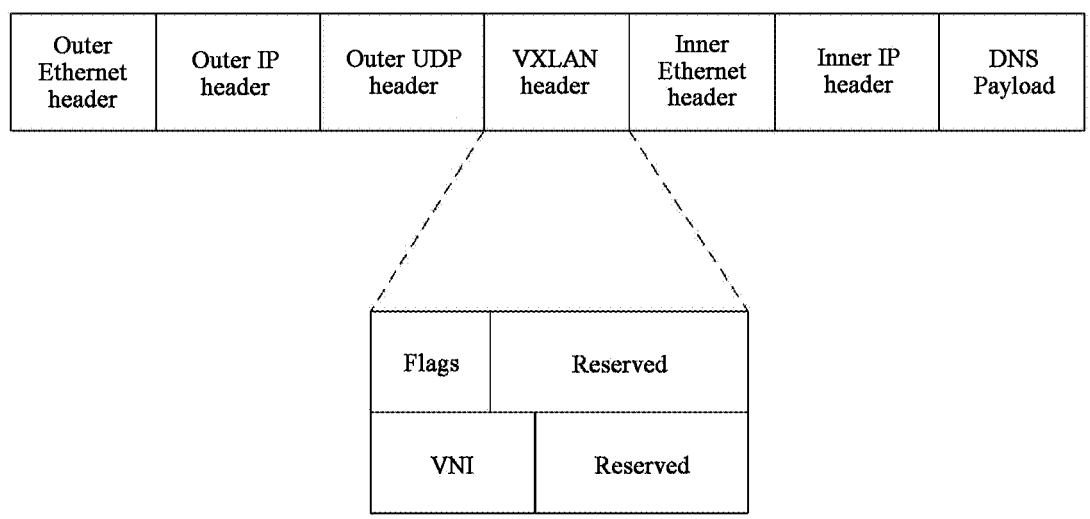
FIG. 6 is a schematic structural diagram of a virtual extensible local area network message according to an embodiment of the present disclosure.

As shown in FIG. 6, taking encapsulating the domain name resolution message through the extended domain name resolution protocol as an example, the structure of the obtained virtual extensible local area network message includes: an outer Ethernet header (Outer Ethernet header), an outer IP header (Outer IP header), an outer UDP header (Outer UDP header), a VXLAN header (VXLAN header), an inner Ethernet header (Inner Ethernet header), an inner IP header (Inner IP header), and a domain name resolution payload (DNS Payload). The VXLAN header (VXLAN header) includes a flag (Flags), a first reserved bit (Reserved), a virtual extensible local area network identifier (VNI), and a second reserved bit (Reserved). The length of the first reserved bit (Reserved) is greater than the length of the second reserved bit (Reserved), and the functions of each part in the structure of the virtual extensible local area network message may be referred to the EDNS protocol, which will not be repeated.

In this embodiment, the network module implemented through the vSwitch supports configuration of more virtual devices, and has the advantages of strong expandability, high performance, and low cost, so that the solution in this embodiment can be better adapted to the private network DNS resolution in the edge cloud computing scenario.

Step S202, converting the first domain name resolution request into a second domain name resolution request, and sending the second domain name resolution request to an authoritative domain name system, wherein the authoritative domain name system is deployed on a second physical machine, and the second physical machine is disposed in a second edge computer room.

Specifically, the above step S202 includes the following steps.

Step S2021, parsing outer network information, a virtual extensible local area network identifier, and message payload information from the virtual extensible local area network message.

As shown in FIG. 6, the outer network information includes an outer Ethernet header (Outer Ethernet header) and an outer IP header (Outer IP header), and the message payload information includes a domain name resolution payload (DNS Payload).

The virtual extensible local area network identifier in this embodiment represents an ID (Identity Document) that can be used for achieving tenant isolation, different virtual extensible local area network identifiers may correspond to different tenants, and the virtual extensible local area network identifier is specifically a VNI (VXLAN Network ID).

Figure 7:
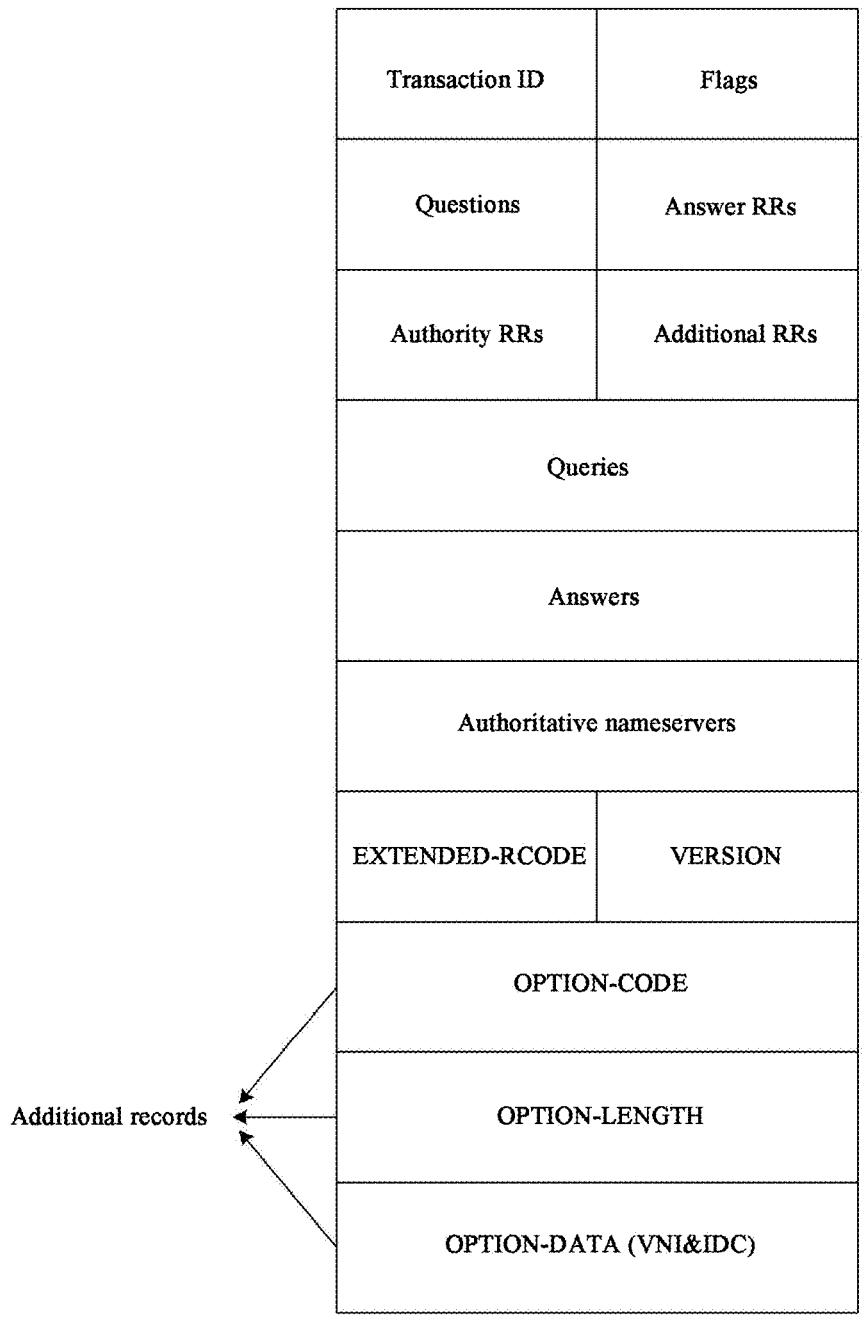
FIG. 7 is a schematic structural diagram of a message constructed based on an extended domain name resolution protocol according to an embodiment of the disclosure.

The resolver (Resolver) in this embodiment parses and strips the VXLAN header and the Inner header to obtain the VNI in the message, and then inserts the VNI into the EDNS field of the DNS message (the virtual extensible local area network message in this embodiment). Option Code reserved in the EDNS protocol may be used for specific arrangement. As shown in FIG. 7 which is a schematic structural diagram of a message constructed based on the extended domain name resolution protocol, the structure of the message includes a transaction ID (Transaction ID), a flag (Flags), the number of questions (Questions), the number of answer resource records (Answer RRs), the number of authority resource records (Authority RRs), the number of additional resource records (Additional RRs), a query (Queries), the number of answers (Answers), an authoritative name server (Authoritative nameservers), an extended return code (EXTENDED-RCODE), a version (VERSION), an option code (OPTION-CODE), an option length (OPTION-LENGTH), and option data (OPTION-DATA). The option data in this embodiment is specifically VNI&IDC (a virtual extensible local area network identifier and computer room encoding information). Additional information (Additional records) includes an option code (OPTION-CODE), an option length (OPTION-LENGTH), and option data (OPTION-DATA).

Step S2022, generating the second domain name resolution request based on the outer network information, the virtual extensible local area network identifier, and the message payload information.

Specifically, in this embodiment, the related information such as the outer network information, the virtual extensible local area network identifier, and the message payload information may be encapsulated into a message representing the second domain name resolution request.

Step S203, receiving a resolution result of the second domain name resolution request by the authoritative domain name system, and forwarding the resolution result to the virtual device through the network module. For details, please refer to step S103 of the embodiment shown in FIG. 1, which will not be repeated here.

In the domain name resolution method provided in this embodiment, the VNI can be parsed from the virtual extensible local area network message, so that a set of tenant-isolated domain name resolution process is implemented. By specifying the VNI in each domain name resolution rule, the domain configurations of different VNIs can be independent and non-conflicting, thereby achieving the purpose of private network domain name resolution.

Figure 3:
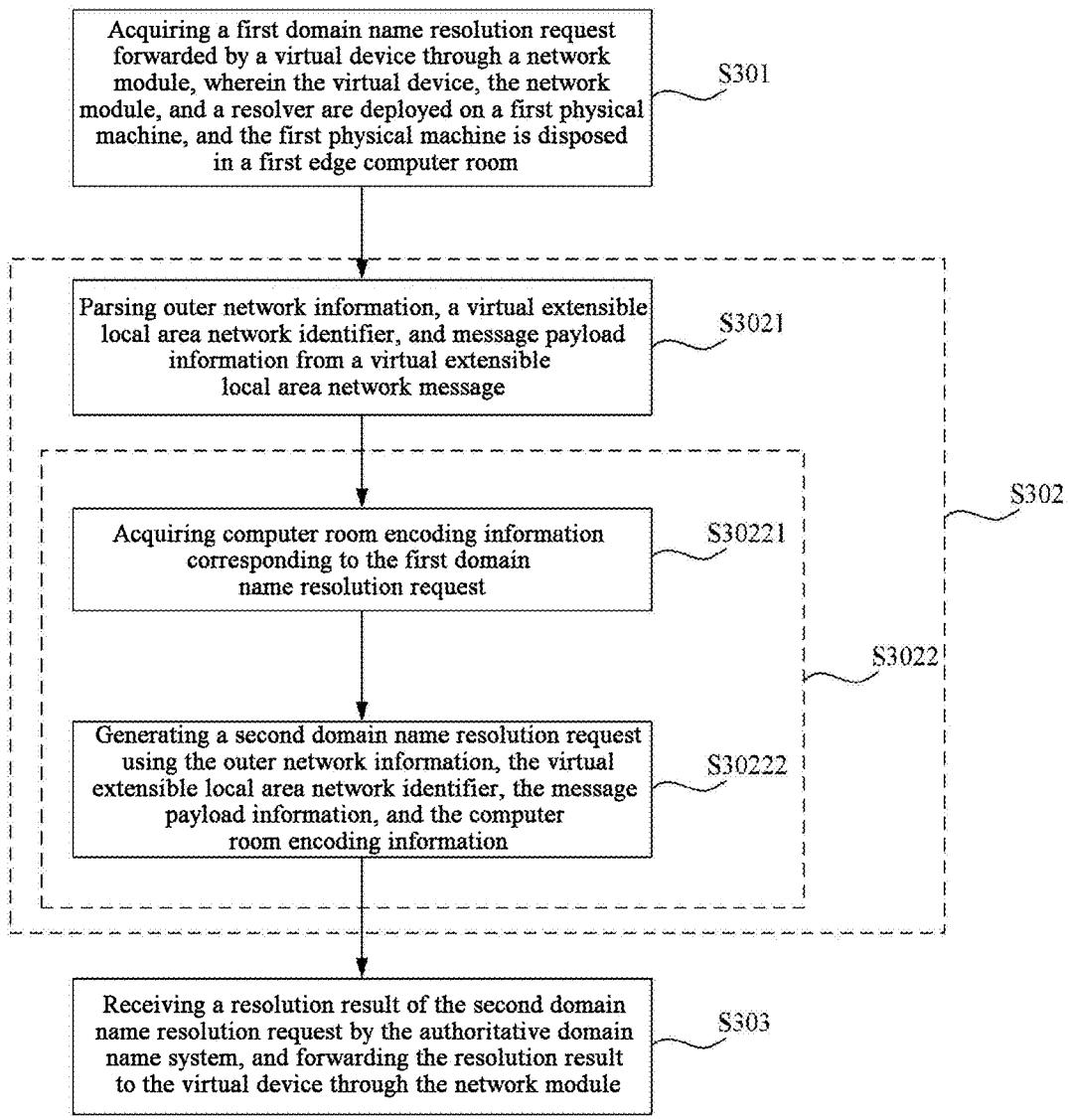
FIG. 3 is a schematic flowchart of yet another domain name resolution method for edge computing according to an embodiment of the present disclosure.

In this embodiment, a domain name resolution method for edge computing is provided, which can be applied to a resolver. FIG. 3 is a flowchart of a domain name resolution method for edge computing according to an embodiment of the present disclosure. As shown in FIG. 3, the process includes the following steps.

Step S301, acquiring a first domain name resolution request forwarded by a virtual device through a network module, wherein the virtual device, the network module, and the resolver are deployed on a first physical machine, and the first physical machine is disposed in a first edge computer room. For details, please refer to step S201 of the embodiment shown in FIG. 2, which will not be repeated here.

Step S302, converting the first domain name resolution request into a second domain name resolution request, and sending the second domain name resolution request to an authoritative domain name system, wherein the authoritative domain name system is deployed on a second physical machine, and the second physical machine is disposed in a second edge computer room.

Specifically, the above step S302 includes the following steps.

Step S3021, parsing outer network information, a virtual extensible local area network identifier, and message payload information from the virtual extensible local area network message. For details, please refer to step S2021 of the embodiment shown in FIG. 2, which will not be repeated here.

Step S3022, generating the second domain name resolution request based on the outer network information, the virtual extensible local area network identifier, and the message payload information.

Specifically, the above step S3022 includes the following steps.

Step S30221, acquiring computer room encoding information corresponding to the first domain name resolution request.

The computer room encoding information is, for example, a computer room ID, and specifically a first edge computer room ID. In this embodiment, the computer room encoding information may be configured on the resolver (Resolver), that is, the computer room ID information is configured on the resolver, and the computer room ID is used for distinguishing between different first edge computer rooms.

Step S30222, generating the second domain name resolution request using the outer network information, the virtual extensible local area network identifier, the message payload information, and the computer room encoding information.

Figure 8:
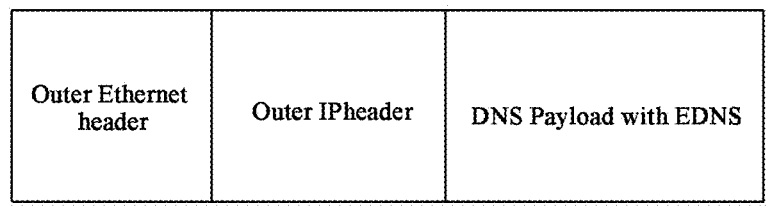
FIG. 8 is a schematic structural diagram of an extended domain name resolution message according to an embodiment of the present disclosure.

As shown in FIG. 8, in this embodiment, the outer network information, the virtual extensible local area network identifier, the message payload information, and the computer room encoding information may be encapsulated into a message representing the second domain name resolution request. The outer network information may include an outer Ethernet header (Outer Ethernet header) and an outer IP header (Outer IP header), and the virtual extensible local area network identifier and the message payload information are encapsulated in a DNS payload with EDNS (DNS Payload with EDNS).

In the domain name resolution method for edge computing provided in this embodiment, the different second domain name resolution requests are further distinguished through the computer room encoding information, so that the different second domain name resolution requests can still be distinguished in the case that the virtual extensible local area network identifiers are the same, thereby achieving a better tenant isolation effect in the domain name resolution process.

In some optional implementations, the above step S30222 includes: encapsulating the outer network information, the virtual extensible local area network identifier, the message payload information, and the computer room encoding information into an extended domain name resolution message based on an extended domain name resolution protocol, wherein the second domain name resolution request is the extended domain name resolution message.

In this embodiment, the extended domain name resolution protocol is an EDNS (Extension Mechanisms for DNS) protocol. The outer network information, the virtual extensible local area network identifier, the message payload information, and the computer room encoding information are encapsulated through the EDNS protocol, which can provide a larger DNS message size and support the expansion of functions and options. Moreover, the message encapsulated based on the EDNS protocol can improve the communication efficiency between the Resolver and the authoritative DNS, and reduce the delay of the DNS query.

Step S303, receiving a resolution result of the second domain name resolution request by the authoritative domain name system, and forwarding the resolution result to the virtual device through the network module.

Specifically, after receiving the extended domain name resolution message, the authoritative domain name system performs the tenant-isolated domain name resolution through the VNI&IDC. The resolution result is responded to the resolver of the corresponding first physical machine as a DNS data packet. The resolver may find the original session connection by receiving the quintuple data of the message, and then obtain the address of the Inner part to be encapsulated, and then encapsulate the VXLAN header for the DNS data packet to form a new VXLAN (virtual extensible local area network) data packet. The original address and the target address in the header of the response message as the resolution result need to be exchanged, and the final message is sent to the virtual machine that sends the domain name resolution request through the virtual switch (vSwitch).

It should be understood that in the edge computing scenario, the physical machines disposed in the edge computer rooms specifically involved in the present disclosure, for example, may include but are not limited to the aforementioned first physical machine and second physical machine, may be understood as a kind of edge computing nodes.

As shown in FIG. 5, in this embodiment, a domain name resolution system for edge computing is provided, and the domain name resolution system for edge computing includes but is not limited to a virtual device, a network module, a resolver, and an authoritative domain name system.

The virtual device is configured to send a private network domain name resolution request to the network module.

The network module is configured to convert the private network domain name resolution request into the first domain name resolution request, and send the first domain name resolution request to the resolver.

The resolver is configured to convert the first domain name resolution request into a second domain name resolution request, and send the second domain name resolution request to the authoritative domain name system. The virtual device, the network module, and the resolver are deployed on the first physical machine, and the first physical machine is disposed in the first edge computer room.

The authoritative domain name system is configured to resolve the second domain name resolution request to obtain the resolution result. The authoritative domain name system is further configured to send the resolution result to the resolver. The authoritative domain name system is deployed on the second physical machine, The second physical machine is disposed in the second edge computer room.

The resolver is further configured to forward the resolution result to the network module.

The network module is further configured to forward the resolution result to the virtual device.

The present embodiment provides a distributed private network DNS system suitable for an edge computing scenario, which can be deployed in discrete edge computer rooms in a distributed manner, so that the problem of complex DNS deployment in the edge computing scenario is solved. In addition, the architecture of the domain name resolution system provided in the present embodiment does not require a set of DNS system to be deployed in each edge computer room independently. Thus, the authoritative domain name system and the virtual device resource are deployed separately on the basis of implementing the function of domain name resolution, so that the case where a set of domain name system is deployed for each edge computer room is avoided, and the problems in the related art that the scale of the domain name system in the edge cloud computing scenario is large, the maintenance is difficult, and the deployment cost is high are overcome. The domain name resolution architecture for edge computing provided in the embodiments of the present disclosure is applied to the private network DNS in the edge computing scenario, and provides a complete set of DNS solutions, and can also solve the problem of tenant isolation for the DNS resolution in the edge computing scenario. The domain name resolution system for edge computing provided in the present embodiment has a wide range of applications, and can greatly reduce the DNS resource consumption in the edge computing environment.

In some optional implementations, the first domain name resolution request is a virtual extensible local area network message.

Specifically, the resolver is configured to parse outer network information, a virtual extensible local area network identifier, and message payload information from the virtual extensible local area network message, and generate the second domain name resolution request based on the outer network information, the virtual extensible local area network identifier, and the message payload information.

In some optional implementations, the resolver is specifically configured to acquire computer room encoding information corresponding to the first domain name resolution request; and the resolver is specifically configured to generate the second domain name resolution request using the outer network information, the virtual extensible local area network identifier, the message payload information, and the computer room encoding information.

In some optional implementations, the resolver is specifically configured to encapsulate the outer network information, the virtual extensible local area network identifier, the message payload information, and the computer room encoding information into an extended domain name resolution message based on an extended domain name resolution protocol, wherein the second domain name resolution request is the extended domain name resolution message.

In some optional implementations, the network module is a virtual switch, and the virtual switch is configured to encapsulate a domain name resolution message sent by the virtual device into a virtual extensible local area network message.

In some optional implementations, the resolver is specifically configured to maintain a session connection between the resolver and the network module, and forward the resolution result to the virtual device through the network module based on the session connection between the resolver and the network module.

In some optional implementations, the resolver is further configured to acquire configuration information delivered by an edge private network domain name system console, wherein the configuration information is used for characterizing a resolution rule for a target domain name resolution request, and the target domain name resolution request includes the first domain name resolution request.

In some optional implementations, the domain name resolution system for edge computing further includes a load balance; and the resolver is specifically configured to send the second domain name resolution request to a load balance device, wherein the load balance device is configured to allocate the second domain name resolution request to the authoritative domain name system.

In some optional implementations, there are at least two second edge computer rooms.

For the detailed implementations of the components included in the domain name resolution system, such as the virtual device, the network module, the resolver, and the authoritative domain name system, they have been described in detail in the aforementioned embodiments, and will not be repeated here.

In this embodiment, a domain name resolution apparatus for edge computing is further provided, and the apparatus is configured to implement the above embodiments and preferred implementations, which will not be repeated. As used below, the term "module" may be a combination of software and/or hardware that implements a predetermined function. Although the apparatus described in the following embodiments is preferably implemented in software, the implementation of hardware, or a combination of software and hardware, is also possible and conceived.

Figure 10:
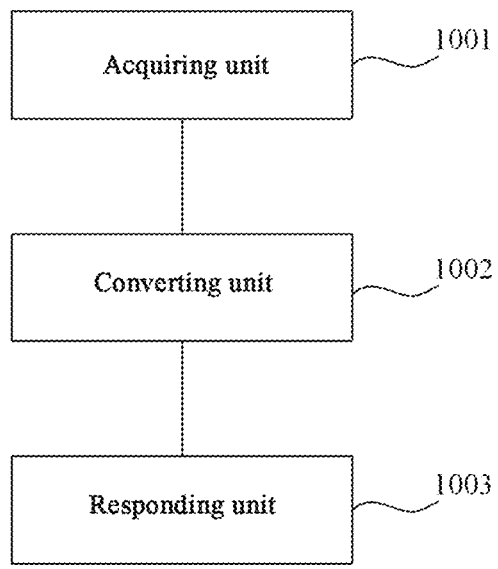
FIG. 10 is a structural block diagram of a domain name resolution apparatus for edge computing according to an embodiment of the present disclosure.

In this embodiment, a domain name resolution apparatus for edge computing is provided. As shown in FIG. 10, the apparatus includes:
an acquiring unit 1001, configured to acquire a first domain name resolution request forwarded by a virtual device through a network module, wherein the virtual device, the network module, and a resolver are deployed on a first physical machine, and the first physical machine is disposed in a first edge computer room;
a converting unit 1002, configured to convert the first domain name resolution request into a second domain name resolution request, and send the second domain name resolution request to an authoritative domain name system, wherein the authoritative domain name system is deployed on a second physical machine, and the second physical machine is disposed in a second edge computer room; and
a responding unit 1003, configured to receive a resolution result of the second domain name resolution request by the authoritative domain name system, and forward the resolution result to the virtual device through the network module.

In some optional implementations, the first domain name resolution request is a virtual extensible local area network message.

The converting unit 1002 includes:
a parsing sub-unit, configured to parse outer network information, a virtual extensible local area network identifier, and message payload information from the virtual extensible local area network message; and
a generation sub-unit, configured to generate the second domain name resolution request based on the outer network information, the virtual extensible local area network identifier, and the message payload information.

In some optional implementations, the generation sub-unit includes:
an acquisition sub-unit, configured to acquire computer room encoding information corresponding to the first domain name resolution request.

A creation sub-unit is configured to generate the second domain name resolution request using the outer network information, the virtual extensible local area network identifier, the message payload information, and the computer room encoding information.

In some optional implementations, the creation sub-unit is specifically configured to encapsulate the outer network information, the virtual extensible local area network identifier, the message payload information, and the computer room encoding information into an extended domain name resolution message based on an extended domain name resolution protocol, wherein the second domain name resolution request is the extended domain name resolution message.

In some optional implementations, the network module is a virtual switch, and the virtual switch is configured to encapsulate a domain name resolution message sent by the virtual device into the virtual extensible local area network message.

In some optional implementations, the domain name resolution apparatus for edge computing further includes a session maintenance unit.

The session maintenance unit is configured to maintain a session connection between the resolver and the network module while converting the first domain name resolution request into the second domain name resolution request.

The responding unit 1003 is specifically configured to forward the resolution result to the virtual device through the network module based on the session connection between the resolver and the network module.

In some optional implementations, the domain name resolution apparatus for edge computing further includes a configuration acquiring unit.

The configuration acquiring unit is configured to acquire configuration information delivered by an edge private network domain name system console, wherein the configuration information is used for characterizing a resolution rule for a target domain name resolution request, and the target domain name resolution request includes the first domain name resolution request.

In some optional implementations, the converting unit 1002 is specifically configured to send the second domain name resolution request to a load balance device, wherein the load balance device is configured to allocate the second domain name resolution request to the authoritative domain name system.

In some optional implementations, there are at least two second edge computer rooms.

For further functional descriptions of the above modules and units, reference may be made to the above corresponding embodiments, which will not be repeated here.

The domain name resolution apparatus for edge computing in this embodiment is presented in the form of functional units. The units here refer to an application specific integrated circuit (ASIC) circuit, a processor and a memory that execute one or more pieces of software or fixed programs, and/or other devices that can provide the above functions.

The embodiments of the present disclosure further provide a computer device, which has the above domain name resolution apparatus for edge computing shown in FIG. 10.

Figure 11:
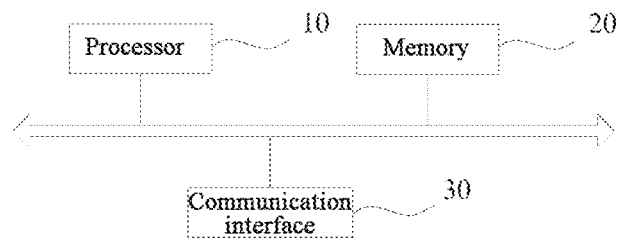
FIG. 11 is a schematic hardware structural diagram of a computer device according to an embodiment of the present disclosure.

Please refer to FIG. 11, which is a schematic structural diagram of a computer device according to an optional embodiment of the present disclosure. As shown in FIG. 11, the computer device includes: one or more processors 10, a memory 20, and interfaces for connecting components, including a high-speed interface and a low-speed interface. The components are communicatively connected to each other through different buses, and may be installed on a common motherboard or in other manners according to requirements. The processor may process instructions executed in the computer device, including instructions stored in the memory or on the memory to display graphic information of a GUI on an external input/output apparatus (such as a display device coupled to the interface). In some optional implementations, multiple processors and/or multiple buses may be used together with multiple memories and multiple memories if required. Similarly, multiple computer devices may be connected, and each device provides part of necessary operations (for example, as a server array, a group of blade servers, or a multi-processor system). In FIG. 11, one processor 10 is taken as an example.

The processor 10 may be a central processing unit, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable logic gate array, a general array logic, or any combination thereof.

The memory 20 stores instructions executable by at least one processor 10, so that the at least one processor 10 executes the method shown in the above embodiments.

The memory 20 may include a program storage region and a data storage region. The program storage region may store an operating system and applications required for at least one function. The data storage region may store data created according to the use of the computer device. In addition, the memory 20 may include a high-speed random-access memory, and may also include a non-transitory memory, such as at least one magnetic disk storage device, a flash memory device, or other non-transitory solid-state storage devices. In some optional implementations, the memory 20 may optionally include a memory disposed remotely from the processor 10, and these remote memories may be connected to the computer device through a network. Examples of the network include but are not limited to the Internet, an intranet, a local area network, a mobile communication network, and a combination thereof.

The memory 20 may include a volatile memory, for example, a random-access memory; the memory may also include a non-volatile memory, for example, a flash memory, a hard disk, or a solid-state disk; and the memory 20 may further include a combination of the above-mentioned types of memories.

The computer device further includes a communication interface 30 for the computer device to communicate with other devices or communication networks.

The embodiments of the present disclosure further provide a computer-readable storage medium. The above method according to the embodiments of the present disclosure may be implemented in hardware or firmware, or implemented as computer code that may be recorded in a storage medium, or implemented as computer code that is originally stored in a remote storage medium or a non-transitory machine-readable storage medium and downloaded through a network and will be stored in a local storage medium, so that the method described herein may be stored in such software processing on a storage medium using a general-purpose computer, a special-purpose processor, or programmable or special-purpose hardware. The storage medium may be a magnetic disk, an optical disk, a read-only memory, a random-access memory, a flash memory, a hard disk, a solid-state disk, or the like; and further, the storage medium may further include a combination of the above-mentioned types of memories. It may be understood that the computer, the processor, the microprocessor controller, or the programmable hardware includes a storage component capable of storing or receiving the software or the computer code, and when the software or the computer code is accessed and executed by the computer, the processor, or the hardware, the method shown in the above embodiments is implemented.

Although the embodiments of the present disclosure are described with reference to the drawings, those skilled in the art may make various modifications and variations without departing from the spirit and scope of the present disclosure, and such modifications and variations all fall within the scope defined by the appended claims.

We claim:

1. A domain name resolution method for edge computing, wherein the method is applied to a resolver, and the method comprises:
acquiring a first domain name resolution request forwarded by a virtual device through a network module, wherein the virtual device, the network module, and the resolver are deployed on a first physical machine, and the first physical machine is disposed in a first edge computer room, and the resolver is a resolution node that belongs to a component for DNS recursion and iteration, and the resolver is configured to shunt a DNS request, forward an internal network tenant domain name to an authoritative domain name system, and forward an external network recursive resolution request to an external network, and a computer room ID information is configured on the resolver for distinguishing between different first edge computer rooms;

converting the first domain name resolution request into a second domain name resolution request, and sending the second domain name resolution request to the authoritative domain name system, wherein the authoritative domain name system is deployed on a second physical machine, and the second physical machine is disposed in a second edge computer room, and the authoritative domain name system deployed on the second physical machine provides a domain name resolution resource for the virtual device on the first physical machine, and the domain name resolution resource is provided as a shared resource to virtual machines deployed in the first edge computer room, and the second edge computer room is, a central computer room in a central cloud computing scenario; and receiving a resolution result of the second domain name resolution request by the authoritative domain name system, and forwarding the resolution result to the virtual device through the network module.

2. The method according to claim 1, wherein the first domain name resolution request is a virtual extensible local area network message, and converting the first domain name resolution request into the second domain name resolution request comprises:

parsing outer network information, a virtual extensible local area network identifier, and message payload information from the virtual extensible local area network message; and generating the second domain name resolution request based on the outer network information, the virtual extensible local area network identifier, and the message payload information.

3. The method according to claim 2, wherein generating the second domain name resolution request based on the outer network information, the virtual extensible local area network identifier, and the message payload information comprises:

acquiring computer room encoding information corresponding to the first domain name resolution request; and generating the second domain name resolution request using the outer network information, the virtual extensible local area network identifier, the message payload information, and the computer room encoding information.

4. The method according to claim 3, wherein generating the second domain name resolution request using the outer network information, the virtual extensible local area network identifier, the message payload information, and the computer room encoding information comprises:

encapsulating the outer network information, the virtual extensible local area network identifier, the message payload information, and the computer room encoding information into an extended domain name resolution message based on an extended domain name resolution protocol, wherein the second domain name resolution request is the extended domain name resolution message.

5. The method according to claim 2, wherein the network module is a virtual switch, and the virtual switch is configured to encapsulate a domain name resolution message sent by the virtual device into the virtual extensible local area network message.

6. The method according to claim 1, wherein while converting the first domain name resolution request into the second domain name resolution request, the method further comprises: maintaining a session connection between the resolver and the network module; and wherein forwarding the resolution result to the virtual device through the network module comprises: forwarding the resolution result to the virtual device through the network module based on the session connection between the resolver and the network module.

7. The method according to claim 1, wherein before acquiring the first domain name resolution request forwarded by the virtual device through the network module, the method further comprises:

acquiring configuration information delivered by an edge private network domain name system console, wherein the configuration information is used for characterizing a resolution rule for a target domain name resolution request, and the target domain name resolution request comprises the first domain name resolution request.

8. The method according to claim 1, wherein sending the second domain name resolution request to the authoritative domain name system comprises:

sending the second domain name resolution request to a load balance device, wherein the load balance device is configured to allocate the second domain name resolution request to the authoritative domain name system.

9. The method according to claim 1, wherein there are at least two second edge computer rooms.

10. A domain name resolution system for edge computing, comprising:

a virtual device configured to send a private network domain name resolution request to a network module;

the network module configured to convert the private network domain name resolution request into a first domain name resolution request, and send the first domain name resolution request to a resolver;

the resolver configured to convert the first domain name resolution request into a second domain name resolution request, and send the second domain name resolution request to an authoritative domain name system, wherein the virtual device, the network module, and the resolver are deployed on a first physical machine, and the first physical machine is disposed in a first edge computer room, and the resolver is a resolution node that belongs to a component for DNS recursion and iteration, and the resolver is configured to shunt a DNS request, forward an internal network tenant domain name to the authoritative domain name system, and forward an external network recursive resolution request to an external network, and a computer room ID information is configured on the resolver for distinguishing between different first edge computer rooms;

the authoritative domain name system configured to resolve the second domain name resolution request to obtain a resolution result, and further configured to send the resolution result to the resolver, wherein the authoritative domain name system is deployed on a second physical machine, and the second physical machine is disposed in a second edge computer room, and the authoritative domain name system deployed on the second physical machine provides a domain name resolution resource for the virtual device on the first physical machine, and the domain name resolution resource is provided as a shared resource to virtual machines deployed in the first edge computer room, and the second edge computer room is, a central computer room in a central cloud computing scenario;

the resolver further configured to forward the resolution result to the network module; and the network module further configured to forward the resolution result to the virtual device.

11. A computer device, comprising:

a memory and a processor, wherein the memory and the processor communicate with each other, the memory stores computer instructions, and the processor executes the computer instructions to perform a domain name resolution method for edge computing comprising:

acquiring a first domain name resolution request forwarded by a virtual device through a network module, wherein the virtual device, the network module, and the resolver are deployed on a first physical machine, and the first physical machine is disposed in a first edge computer room, and the resolver is a resolution node that belongs to a component for DNS recursion and iteration, and the resolver is configured to shunt a DNS request, forward an internal network tenant domain name to an authoritative domain name system, and forward an external network recursive resolution request to an external network, and a computer room ID information is configured on the resolver for distinguishing between different first edge computer rooms;

converting the first domain name resolution request into a second domain name resolution request, and sending the second domain name resolution request to the authoritative domain name system, wherein the authoritative domain name system is deployed on a second physical machine, and the second physical machine is disposed in a second edge computer room, and the authoritative domain name system deployed on the second physical machine provides a domain name resolution resource for the virtual device on the first physical machine, and the domain name resolution resource is provided as a shared resource to virtual machines deployed in the first edge computer room, and the second edge computer room is, a central computer room in a central cloud computing scenario; and receiving a resolution result of the second domain name resolution request by the authoritative domain name system, and forwarding the resolution result to the virtual device through the network module.

12. The computer device according to claim 11, wherein the first domain name resolution request is a virtual extensible local area network message, and converting the first domain name resolution request into the second domain name resolution request comprises:

parsing outer network information, a virtual extensible local area network identifier, and message payload information from the virtual extensible local area network message; and generating the second domain name resolution request based on the outer network information, the virtual extensible local area network identifier, and the message payload information.

13. The computer device according to claim 12, wherein generating the second domain name resolution request based on the outer network information, the virtual extensible local area network identifier, and the message payload information comprises:

acquiring computer room encoding information corresponding to the first domain name resolution request; and generating the second domain name resolution request using the outer network information, the virtual extensible local area network identifier, the message payload information, and the computer room encoding information.

14. The computer device according to claim 13, wherein generating the second domain name resolution request using the outer network information, the virtual extensible local area network identifier, the message payload information, and the computer room encoding information comprises:

encapsulating the outer network information, the virtual extensible local area network identifier, the message payload information, and the computer room encoding information into an extended domain name resolution message based on an extended domain name resolution protocol, wherein the second domain name resolution request is the extended domain name resolution message.

15. The computer device according to claim 12, wherein the network module is a virtual switch, and the virtual switch is configured to encapsulate a domain name resolution message sent by the virtual device into the virtual extensible local area network message.

16. The computer device according to claim 1, wherein while converting the first domain name resolution request into the second domain name resolution request, the computer device further comprises: maintaining a session connection between the resolver and the network module; and wherein forwarding the resolution result to the virtual device through the network module comprises: forwarding the resolution result to the virtual device through the network module based on the session connection between the resolver and the network module.

17. The computer device according to claim 1, wherein before acquiring the first domain name resolution request forwarded by the virtual device through the network module, the method further comprises:

acquiring configuration information delivered by an edge private network domain name system console, wherein the configuration information is used for characterizing a resolution rule for a target domain name resolution request, and the target domain name resolution request comprises the first domain name resolution request.

18. The computer device according to claim 11, wherein sending the second domain name resolution request to the authoritative domain name system comprises:

sending the second domain name resolution request to a load balance device, wherein the load balance device is configured to allocate the second domain name resolution request to the authoritative domain name system.

19. The computer device according to claim 11, wherein there are at least two second edge computer rooms.

* * * * *